United States Patent
Rousek et al.

(10) Patent No.: US 6,398,172 B1
(45) Date of Patent: *Jun. 4, 2002

(54) SUPPORT FOR A LOAD, ESPECIALLY AN ELECTRIC LIGHT, WITH A STANDARDIZED VERTICALLY ADJUSTABLE SPRING-LOADED ARM

(75) Inventors: Heinz Rousek, Huenfeld; Bernd Schmitt, Huenfeld-Michelsrombach; Rainer Weigl, Fulda-Aschenberg; Matthias Weller, Rosdorf, all of (DE)

(73) Assignee: Wella Aktiengesellschaft, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,247

(22) PCT Filed: Nov. 19, 1998

(86) PCT No.: PCT/EP98/07422

§ 371 (c)(1),
(2), (4) Date: Jul. 15, 1999

(87) PCT Pub. No.: WO99/26015

PCT Pub. Date: May 27, 1999

(30) Foreign Application Priority Data

Nov. 19, 1997 (DE) ......................................... 197 51 315

(51) Int. Cl.[7] ................................................. F16L 3/00
(52) U.S. Cl. ....................................................... 248/121
(58) Field of Search ........................... 248/121, 280.11, 248/292.11, 125.1, 125.8, 411, 188, 535, 222.11, 224.61, 325, 334.1

(56) References Cited

U.S. PATENT DOCUMENTS

| | | | | |
|---|---|---|---|---|
| 1,261,755 A | * | 4/1918 | Beyle | 248/121 |
| 4,107,769 A | * | 8/1978 | Saluja | 248/280 |
| 4,160,536 A | * | 7/1979 | Krogsrud | 248/280.1 |
| 4,166,602 A | * | 9/1979 | Nilsen et al. | 248/280.1 |
| 4,645,156 A | * | 2/1987 | Karapita | 248/280.1 |
| 4,770,384 A | * | 9/1988 | Kuwazima et al. | 248/281.1 |
| 4,863,133 A | * | 9/1989 | Bonnell | 248/278 |
| 5,037,053 A | * | 8/1991 | Fox et al. | 248/278 |
| 5,458,305 A | * | 10/1995 | Woodward | 248/121 |
| 5,772,162 A | * | 6/1998 | Lin | 248/121 |
| 6,164,612 A | * | 12/2000 | Schmitt | 248/280.11 |

* cited by examiner

Primary Examiner—Ramon O. Ramirez
Assistant Examiner—A. Joseph Wujciak
(74) Attorney, Agent, or Firm—Michael J. Striker

(57) ABSTRACT

The support for a load, particularly a lamp, includes a standard spring-loaded arm (3) which is pivotable about a vertical axis and vertically adjustable for holding and positioning the load (4). The spring-loaded arm (3) is connected with other parts (9,8) of the support by engagement of an upwardly directed pin-shaped connector element (5) in a downwardly directed connector pipe or socket section (6), so that the spring-loaded arm (3) is suspended from the other parts. The spring-loaded arm (3) with the upwardly directed pin-shaped connector element (5) has universal applicability in a variety of supports including ceiling or wall supports, which have a cantilever arm (8) from which the connector pipe section (6) extends downwardly, and floor or table supports, which have a stand (14,22) and a support tube (9) extending upward from the stand and having a curved section (10) to which the connector pipe section (6) is attached.

10 Claims, 4 Drawing Sheets

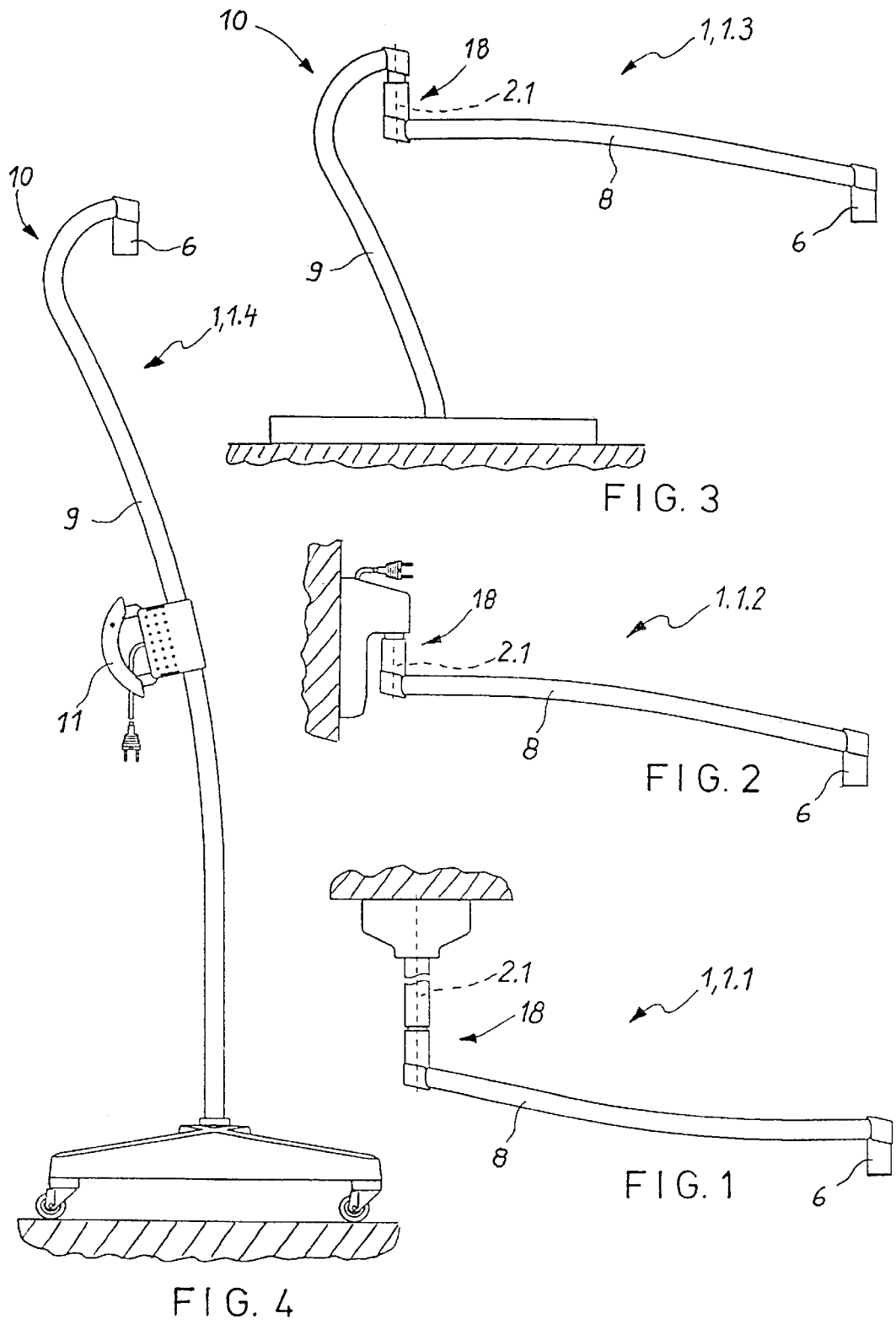

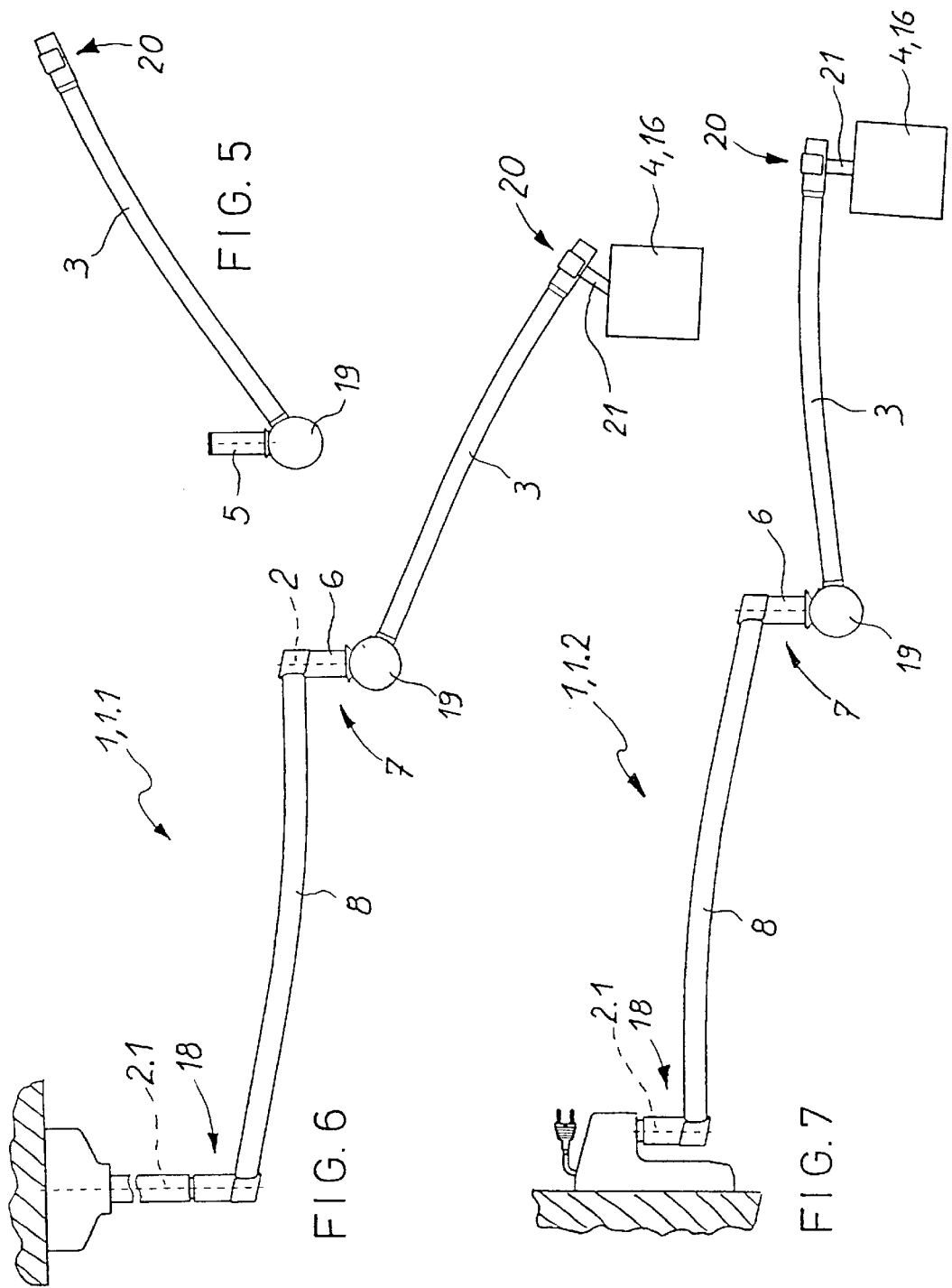

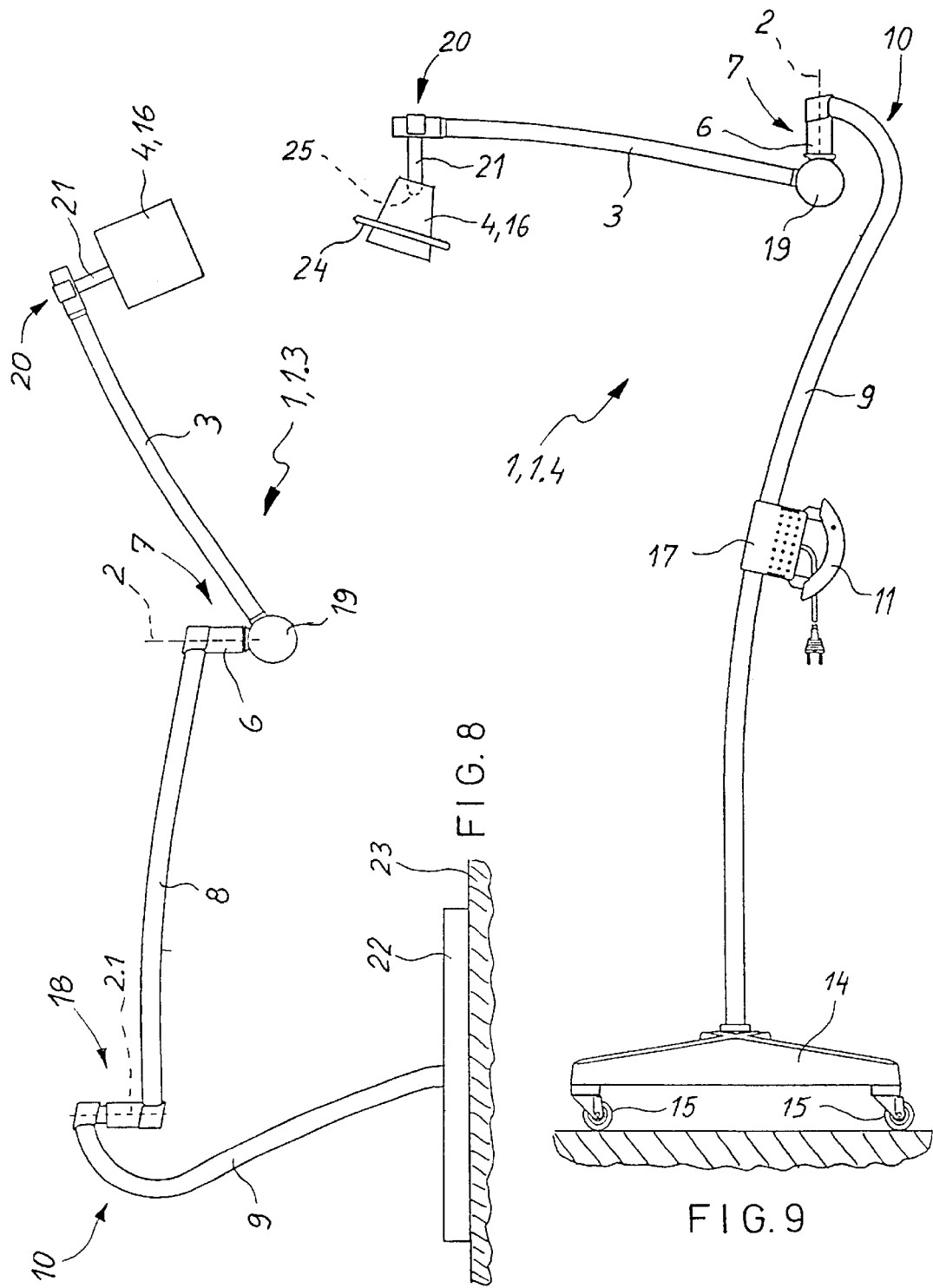

SUPPORT FOR A LOAD, ESPECIALLY AN ELECTRIC LIGHT, WITH A STANDARDIZED VERTICALLY ADJUSTABLE SPRING-LOADED ARM

BACKGROUND OF THE INVENTION

The present invention relates to a support for a load, e.g. an electric light, and, more particularly, to a support comprising a spring-loaded pivotable arm, which is vertically adjustable for holding and positioning the load and a connector element for connection with other parts or elements of the support.

SUMMARY OF THE INVENTION

It is the object of the invention to provide a support of the type mentioned above in which the same spring-loaded arm can be used for a wide variety of supports (ceiling supports, wall supports, table supports and floor supports).

According to the invention the support for a load, especially a lamp, includes a downwardly directed connector pipe section, preferably extending downward from a wall or ceiling fixture or a curved section of a support tube supported on a stand;

a vertically adjustable spring-loaded arm for holding and positioning the load; and an upwardly directed pin-shaped connector element connected with the vertically adjustable spring-loaded arm and pivotably engaged with the downwardly directed connector pipe section to form a suspended pivot connection for pivoting the vertically adjustable spring-loaded arm horizontally about a vertical axis.

The support structure according to the invention can advantageously be used in a number of different fixtures and stands, especially for lamps. It can be constructed as a standard module so that the manufacturing of a variety of stands and fixtures is made easier and more economical.

Various preferred embodiments are possible. In a particularly preferred embodiment the upwardly directed pin-shaped connector element has a retaining ring around its upper part to hold the pin-shaped connector element in the connector pipe section so that the pin-shaped connector element pivots or rotates in a horizontal rotation direction in the connector pipe section. Advantageously the spring-loaded arm includes a spring and a spring force adjusting device for the spring. Furthermore a pivot joint for connecting the upwardly-directed pin-shaped connector element with the spring-loaded arm is provided so that the spring-loaded arm may be vertically adjusted as well as horizontally pivoted.

In some embodiments a cantilever arm is pivotally connected to the connector pipe section and means for connecting the cantilever arm to a ceiling or a wall fixture are provided, which can be another pivot joint.

In other embodiments a stand and a support tube extending upward from the stand are provided. In these other embodiments the support tube has an upper curved section with the downwardly directed connector pipe section connected to an otherwise free end. The stand is provided with wheels and the support tube has a handle for directing motion of the stand, e.g., over a floor. The support can also include a low-voltage transformer housing connected with the support tube and handle so that they form a unit.

BRIEF DESCRIPTION OF THE DRAWING

The objects, features and advantages of the invention will be illustrated in more detail with the aid of the following description of the preferred embodiments, with reference to the accompanying figures in which:

FIG. 1 is a side view of ceiling fixture without a spring-leaded arm according to the invention;

FIG. 2 is a side view of a wall fixture without a spring-loaded arm according to the invention;

FIG. 3 is a side view of a table stand without a spring-loaded arm according to the invention;

FIG. 4 is a side view of a floor stand without a spring-loaded arm according to the invention;

FIG. 5 is a side view of a spring-loaded arm according to the invention for various supports according to the invention;

FIG. 6 is a side view of a first embodiment of a ceiling support according to the invention including a spring-loaded arm;

FIG. 7 is a side view of a second embodiment of a wall support according to the invention including a spring-loaded arm;

FIG. 8 is a side view of a third embodiment of a table support according to the invention including a spring-loaded arm;

FIG. 9 is a side view of a fourth embodiment of a floor support according to the invention including a spring-loaded arm.

DESCRIPTION OF THE PREFERRED EMBODIMENTS

Figure 10:
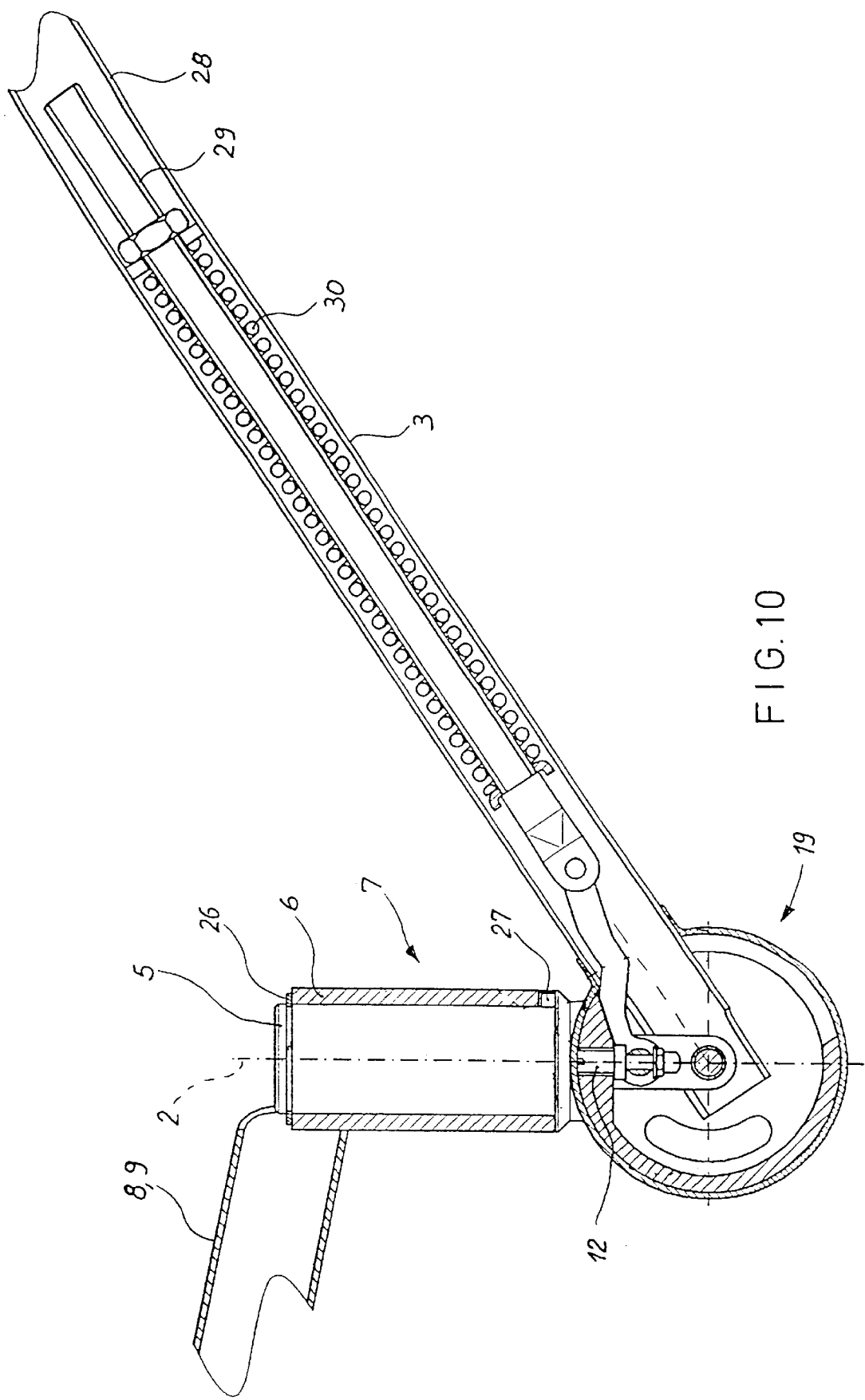
FIG. 10 is a detailed side cross-sectional view of the spring-loaded arm of FIG. 5, showing details of the mechanism.

FIG. 1 shows a side view of a ceiling support 1.1 which is provided with a cantilever arm 8 which is rotatable about an axis 2.1. The cantilever arm 8 has a connector pipe section 6 for receiving a spring-loaded arm 3 according to the invention (FIG. 5).

FIG. 2 shows a wall support 1.2 which is provided with a cantilever arm 8 that is rotatable about an axis 2.1. The cantilever arm 8 has a connector pipe section 6 for receiving a spring-loaded arm 3 according to the invention (FIG. 5).

FIG. 3 shows a table support 1.3 which is provided with a cantilever arm 8 that is rotatable about an axis 2.1. The cantilever arm 8 has a connector pipe section 6 for receiving a spring-loaded arm 3 according to the invention (FIG. 5). The table support 1.3 is provided with a support tube 9 which has a curve section 10 in the upper area, wherein the end of the curve section 10 is connected with the cantilever arm 8 via a pivot joint 18.

FIG. 4 shows a movable floor support 1.4. A connector pipe section 6 is provided for receiving a spring-loaded arm 3 (FIG. 5). The floor support 1.4 is provided with a support tube 9 which has a curve section 10 in the upper area, wherein the end of the curve section 10 is connected with the connector pipe section 6 via a pivot joint 18.

The spring-loaded arm 3 which is provided with a pin-shaped connector element 5 arranged at the top is shown in FIG. 5 as a constructional unit. The spring-loaded arm 3 has a joint 19 for vertical adjustment and a receptacle 20 for receiving a load 4.

A first embodiment example is shown as a ceiling support 1.1 in FIG. 6, wherein, with respect to FIG. 1, the spring-loaded arm 3 is connected with the cantilever arm 8 by means of the suspended connection 7 comprising the connector pipe section 6 and the pin-shaped connector element 5. FIG. 10 shows this in more detail. The free end of the spring-loaded arm 3 is connected with a load 4 via a receptacle 20 by means of a load connection 21, wherein the load connection 21 can be constructed in such a way that the load 4 can be rotated into different positions. A device or a lamp 16 (FIG. 9) can be provided as load 4, for example.

FIG. 7 shows a second embodiment example as a wall support 1.2, wherein, with respect to FIG. 2, the spring-loaded arm 3 is connected with the cantilever arm 8 by means of the suspended connection 7 and carries a load 4, 16.

FIG. 8 shows a third embodiment example as a table support 1.3, wherein, with respect to FIG. 3, the spring-loaded arm 3 is connected with the cantilever arm 8 by means of the suspended connection 7 and carries a load 4, 16. The table support 1.3 has a base 22 such that the table support 1.3 is prevented from tipping over even in extreme positions. This is achieved either in that the base 22 is fixedly connected with a table 23 or in that it is provided with correspondingly large dimensions. The table support 1.3 is preferably suitable for holding a lamp 16, because a lamp 16 generally has little weight. Economical manufacture is made possible by means of standardized pivot joints 18, especially when the cantilever arm 8 also has a standardized design.

FIG. 9 shows a fourth embodiment example as a floor support 1.4, wherein, with respect to FIG. 4, the spring-loaded arm 3 is connected with the support tube 9 by means of the suspended connection 7 and carries a load 4, for example, one or more lamps 16 or other irradiating devices (for example, for therapeutic purposes). Since the floor support 1.4 has a stand 14 which is movable via wheels 15 and can accordingly be positioned as a whole, a cantilever arm 8 was omitted in this case. The support tube 9 is provided with a handle 11 for positioning the floor support 1.4. An economical constructional unit is formed by the handle 11 and the low-voltage transformer housing 17, wherein the corresponding transformer supplies power to the lamp 16 via a cable inside the support tube 9, suspended connection 7, joint 19, spring arm 3 and load connection 21. A ring 24 is provided for precise positioning of the lamp 16 by means of a joint 25, indicated in dashed lines.

FIG. 10 is an enlarged view of a detail showing the suspended connection 7 of the spring-loaded arm 3, wherein the bush-like connection element 6 is connected preferably by welding—with the cantilever arm 8 or support tube 9. The pin-shaped connector element 5 is connected with the joint 19 of the spring arm 3 (e.g., as an injection-molded metal part). The suspended connection 7 is held together by a retaining ring 26 on the pin-shaped connector element 5 (not shown in section). A corresponding stop 27 is provided for optional rotation limiting. The spring arm 3 comprises a tube 28 in which a spring 30 is integrated. The joint 19 is provided with a spring force adjusting device 12 for adjusting a suitable spring force. A spindle 29 with a compression spring 30 is constructed so as to be hollow in order to guide a supply cable through the spring-loaded arm 3.

The advantages resulting from the invention include the following:

versatile use of a standardized spring-loaded arm 3 in different constructions of the support with standardized suspended connection 7, e.g., floor support, ceiling support, wall support or table support (cost advantage);

versatile use of a standardized cantilever arm 8 in different constructions of the support with standardized pivot joints 18, e.g., floor support, ceiling support, wall support or table support (cost advantage);

possibilities for modular or building-block type combinations reduce extensive storage (cost advantage).

What is claimed is:

1. A support for a load (4), said support comprising a downwardly directed connector pipe section (6);

a vertically adjustable spring-loaded arm (3) for holding and vertically positioning the load (4); and an upwardly-directed pin-shaped connector element (5) connected with the vertically adjustable spring-loaded arm (3) and pivotably engaged with the downwardly directed connector pipe section (6) to form a suspended pivot connection (7) for pivoting the vertically adjustable spring-loaded arm (3) horizontally about a vertical axis.

2. The support as defined in claim 1, wherein said upwardly directed pin-shaped connector element (5) has a retaining ring (26) around an upper part of the connector element to hold said pin-shaped connector element (5) in said connector pipe section (6) so that said pin-shaped connector element (5) pivots in said connector pipe section (6).

3. The support as defined in claims 1, wherein said spring-loaded arm (3) includes a spring (30) and a spring force adjusting device (12) for said spring (30).

4. The support as defined in claims 1, further comprising a pivot joint (19) for connecting the upwardly-directed pin-shaped connector element (5) with the spring-loaded arm (3).

5. The support as defined in claim 1, further comprising a cantilever arm (8) to which said connector pipe section (6) is pivotally connected and means for connecting said cantilever arm (8) to a ceiling or a wall.

6. The support as defined in claim 5, wherein said means for connecting said cantilever arm to said ceiling or said wall includes another pivot joint (18).

7. The support as defined in claims 1, further comprising a stand (14,22) and a support tube (9) extending upward from said stand and wherein said support tube (9) has an upper curved section (10) with said downwardly directed connector pipe section (6) connected to an otherwise free end of said upper curved section (10).

8. The support as defined in claims 7, wherein said stand is provided with wheels (15) and said support tube (9) has a handle (11) for directing motion of said stand over a floor.

9. The support as defined in claim 8, further comprising a low-voltage transformer housing (17) connected with said support tube (9) and said handle (11) and wherein said handle (11) and said low-voltage transformer housing (17) form a unit.

10. The support as defined in claim 1, wherein said load (4) is an electric lamp (16).

* * * * *